Patented Jan. 4, 1938

2,104,023

UNITED STATES PATENT OFFICE 2,104,023

MANUFACTURE OF CELLULOSE ESTERS

Louis Etienne Clement, Meudon, France, assignor, by mesne assignments, to Eastman Kodak Company, Jersey City, N. J., a corporation of New Jersey No Drawing. Application February 25, 1930, Serial No. 431,344. In France October 7, 1929

2 Claims. (Cl. 260—101)

The present invention relates to the acylation of cellulose in the presence of a low-boiling solvent such for instance as methylene chloride. The temperature of the reaction is kept low and degradation of the cellulose is thus avoided.

It is already well known that cellulose esters can be made by treating cellulose (sometimes loosely referred to, particularly in the French literature, as hydrocellulose) in an esterifying bath comprising an anhydride of an acid and an acid diluent, in the presence of a catalyst.

During the process of esterification there is produced an evolution of heat which may cause serious harm in the production of a good quality ester.

After the precipitation of the cellulose ester the constituents of the esterifying bath are usually recovered in order to lower the cost of producing the esters; such recovery is rather a complicated process.

For example in the case of the acetylation of cellulose, there is used an acetylating bath comprising a mixture of acetic anhydride and glacial acetic acid to which is added a catalyst. The acetic acid in the acetylating bath is present as a diluent. The acetic acid, being itself a solvent of the acetate first formed, allows the operation to be carried out in a mixing machine; the acetylation of cellulose is exothermic, the heat produced thereby promoting chemical activity in the reaction mass. When the acetylation is complete, the acetocellulose is precipitated and the constituents of the acetylating bath are recovered; the recovery of the acetic acid which is very dilute is not an easy matter.

The object of the present invention is a method of esterifying cellulose, according to which the acid diluent is replaced completely or partly by methylene chloride, whose boiling point at ordinary room pressure is 42° C.

The methylene chloride in the present application has the following advantages:—

1. It offers a simple means for regulating the temperature of reaction during the esterification. In other words as soon as the temperature of the reaction rises, some of the heat vaporizes the methylene chloride and the temperature of the bath is accordingly controlled by the quantity of methylene chloride employed.

2. It allows of a particularly easy recuperation. The vapors due to the boiling of the methylene chloride during the reaction can be collected and condensed to the liquid state in a reflux apparatus which thus recovers the methylene chloride evaporated during the esterification. On the other hand the methylene chloride is very easily recovered at the time of the precipitation of the cellulose ester, such recovery being effected by simple distillation without causing any inconvenience in obtaining the cellulose ester; for example, the cellulose solution is introduced into an aqueous bath heated to above 42° C., whereupon the cellulose ester precipitates and the methylene chloride distills.

In the manufacture of standard cellulose acetate for example, the methylene chloride has the advantage among others of being a better solvent of acetates than is acetic acid, since the viscosity for equal volume of primary acetate in methylene chloride is half that in acetic acid; consequently, for the same quantity of cellulose, one can use less methylene chloride than acetic acid.

Accordingly an acetylation bath is normally made by using the following proportions:—

| | |
|---|---|
| Cellulose | 100 grams |
| Acetic acid | 400 cc. or about 400 grams |
| Acetic anhydride | 350 grams |
| Catalyst | Sufficient quantity | as compared with a bath made according to my invention as follows:—

| | |
|---|---|
| Cellulose | 100 grams |
| Methylene chloride | 200 cc. or about 260 grams |
| Acetic anhydride | 350 grams |
| Catalyst | Sufficient quantity |

It at once becomes apparent that the production capacity of an acetylation apparatus may obviously be increased roughly in the proportion of 7.4 to 10 by my invention, that is to say that where one acetylates 7.4 kilos of cellulose by the old method in a certain mixer, it is possible to acetylate 10 kilos of cellulose with the same apparatus by my invention as the total volume necessary is substantially the same in either case.

The partial saponification of the cellulose acetate to render it soluble in acetone can be effected readily, by the usual hydrolysis methods which consist in neutralizing the acetic anhydride, and following this by the de-acetylation or saponification which is controlled by the time and the temperature.

The proportions given in the example above are not the only possible ones and they may be varied without departing from this invention. For example, one may replace only a part of the diluent acid by methylene chloride.

On the other hand, if it is desired to limit the temperature of the esterification to a certain fixed figure, the quantity of the diluent can be modified accordingly, and methylene chloride always has advantages over other known diluents, in considerably lowering the minimum reaction temperature for a minimum quantity of diluent used. For example, in the case of the acetylation of cellulose, using the following proportions:—

| | |
|---|---|
| Cellulose | 100 grams |
| Acetic anhydride | 350 grams |
| Methylene chloride | 1000 cc. or about 1300 grams |
| Catalyst | Sufficient quantity | the limit of the reaction temperature is 50° C., this latter being well below the temperature which could be harmful to the quality of the ester obtained.

The esterifying apparatus for carrying out the invention may consist of a mixer of the usual type into which is introduced the mixture of cellulose, acetic anhydride, methylene chloride and the catalyst. The vapours of the methylene chloride to be recovered are led off from the top of the mixer during the esterification and conducted to a condensation apparatus in which they are recovered in the liquid state. This liquid may be returned to the mixer, the latter being arranged so that the esterification can be carried out continuously without necessitating an assiduous supervision.

On the other hand, one can constantly introduce into the mixer by means of any hopper device, new quantities of methylene chloride to maintain the mixture at a convenient dilution. A hopper device can also be situated in the duct through which the recovered methylene chloride is returned to the mixer.

It is obvious that the method and apparatus described above can be varied considerably without departing from this invention.

What I claim as new and desire to be secured by Letters Patent of the United States is:

1. The process of producing cellulose acetate which comprises acetylating the cellulose in the presence of methylene chloride at a temperature which will vaporize sufficient of the methylene chloride to prevent a rise of the reaction temperature substantially above 50° C., collecting methylene chloride vapors given off, condensing them and returning the methylene chloride to the acetylating process.

2. The process of substantially automatically limiting the temperature of the exothermic acetylation of cellulose in an acetylation bath containing methylene chloride which comprises allowing the temperature of the acetylation bath to rise to approximately the boiling point of the methylene chloride and maintaining sufficient methylene chloride in the acetylation bath to limit the rise in temperature of the acetylation bath to approximately 50° C.

LOUIS ETIENNE CLEMENT.